(12) United States Patent
Anderson (10) Patent No.: US 9,596,144 B2
(45) Date of Patent: Mar. 14, 2017

(54) SYSTEMS AND METHODS FOR MANAGING WIDE AREA NETWORKS

(75) Inventor: Michael Anderson, Larkspur, CO (US)

(73) Assignee: Level 3 Communications, LLC, Broomfield, CO (US)

( * ) Notice: Subject to any disclaimer, the term of this patent is extended or adjusted under 35 U.S.C. 154(b) by 987 days.

(21) Appl. No.: 13/363,165

(22) Filed: Jan. 31, 2012

(65) Prior Publication Data

US 2013/0198127 A1  Aug. 1, 2013

(51) Int. Cl.
*G06F 15/18* (2006.01)
*G06F 15/00* (2006.01)
*H04L 12/24* (2006.01)

(52) U.S. Cl.
CPC ........ *H04L 41/142* (2013.01); *H04L 41/0823* (2013.01); *H04L 41/0896* (2013.01)

(58) Field of Classification Search
CPC ... H04L 41/0823; H04L 41/142; G06F 15/18; G06F 15/00
USPC .......................................................... 706/62
See application file for complete search history.

(56) References Cited

U.S. PATENT DOCUMENTS

| | | | |
|---|---|---|---|
| 6,549,533 B1 * | 4/2003 | Campbell | 370/351 |
| 6,738,736 B1 * | 5/2004 | Bond | 703/2 |
| 7,500,158 B1 | 3/2009 | Smith et al. | |
| 2002/0138443 A1 | 9/2002 | Schran et al. | |
| 2004/0143663 A1 | 7/2004 | Leedom et al. | |
| 2009/0147766 A1 * | 6/2009 | Chamberlain et al. | 370/347 |
| 2010/0076997 A1 | 3/2010 | Koike et al. | |
| 2010/0121964 A1 | 5/2010 | Rowles et al. | |
| 2010/0150120 A1 * | 6/2010 | Schlicht et al. | 370/338 |
| 2011/0145657 A1 | 6/2011 | Bishop et al. | |
| 2011/0275364 A1 * | 11/2011 | Austin et al. | 455/423 |
| 2011/0317580 A1 | 12/2011 | Kozisek et al. | |

OTHER PUBLICATIONS

'A Distributed Approach of Proportional Bandwidth Allocation for Real-Time Services in UltraWideBand (UWB) WPANs': Hu, IEEE, 2010, Transaction on parallel and distributed systems, vol. 21,No. 11, pp. 1626-1643.*
International Search Report, mailed Apr. 9, 2013, Int'l Appl. No. PCT/US13/024133, Int'l Filing Date Jan. 31, 2013, 3 pgs.
Written Opinion, mailed Apr. 9, 2013, Int'l Appl. No. PCT/US13/024133, Int'l Filing Date Jan. 31, 2013, 5 pgs.
International Preliminary Report on Patentability, dated Aug. 5, 2014, Int'l Appl. No. PCT/US13/024133, Int'l Filing Date Jan. 31, 2013; 7 pgs.

* cited by examiner

*Primary Examiner* — Stanley K Hill
*Assistant Examiner* — Peter Coughlan (57) ABSTRACT

Systems and methods described herein provide automatic generation of one or more application fingerprints which may be used to identify and recommend one or more technologies and/or technical instructions for use within a WAN environment. Input data describing and an application fingerprint for one or more applications currently used within a network environment, such as a WAN environment, is received and executed against a set of rules by a rules engine. Based on the results, one or more recommendations may be provided that identifies various technologies and/or technical procedures the network manager may implement and/or perform.

20 Claims, 10 Drawing Sheets

WAN Health Checkup Checklist

304

When was the last time you sat down with your WAN partner and assessed your WAN health?

302

○ < 1 Year
○ 1-2 Years
◉ 2+ Years

How many sites are on your wide area network?

○ Single Site
○ 2-10 Sites
○ 11-25 Sites
◉ > 25 Sites

What is your overall satisfaction with your current WAN Design?

○ High
◉ Neutral
○ Low

What is the geographic distribution of your WAN sites?

○ Local <100 miles
○ Regional <1000 miles
◉ National <2500 miles
○ International

FIG. 3A

What technologies are used in your WAN today?

306

Do you use WAN optimization appliances?

How many Classes of Service are used to prioritize your traffic?

FIG. 3B

Do you have Multiple Data Centers?

○ No

○ Yes

⦿ Yes, with offsite backups

Do you use cloud apps or centralized application hosting?

○ No

○ Yes, single host site

⦿ Yes, multiple hosting sites

What tactics do you use for network resiliency?

☐ Service level agreements
☑ Multiple service providers
☐ Backup access connectivity (wireless, etc.)
☐ None Do your remote locations need to access to each other for applications besides voice and email?

⦿ Yes

○ No

Do you have remote workers that require access to Applications hosted over the corporate WAN?

⦿ Yes

How would you describe your current WAN Topology?

- ○ Point - Point
- ○ Hub - Spoke
- ⦿ Tiered
- ○ Full Mesh

FIG. 3D

Which of the following applications does your WAN support now?

| Application | User Satisfaction Low — High | Mission Critical |
|---|---|---|
| ☐ Unified Communications | ○ ○ ● ○ ○ | ☐ |
| ☐ VoIP | ○ ○ ● ○ ○ | ☐ |
| ☐ Video Conferencing (std def.) | ○ ○ ● ○ ○ | ☐ |
| ☐ HD Video Conferencing (telepresence) | ○ ○ ● ○ ○ | ☐ |
| ☑ Storage Replication | ○ ○ ○ ○ ● | ☑ |
| ☑ Sharepoint | ○ ○ ● ○ ○ | ☑ |
| ☑ ERP, SAP, Oracle | ○ ○ ● ○ ○ | ☑ |
| ☑ Desktop Virtualization | ○ ● ○ ○ ○ | ☐ |
| ☑ Server based CRM, Siebel, etc. | ○ ○ ○ ● ○ | ☑ |
| ☑ Cloud based apps, SaaS | ○ ○ ● ○ ○ | ☐ |
| ☐ Cloud based infrastructure, IaaS | ○ ○ ● ○ ○ | ☐ |
| ☐ Cloud based compute, PaaS | ○ ○ ● ○ ○ | ☐ |
| ☐ Point of sale | ○ ○ ● ○ ○ | ☐ |

Which applications will you add in the next 18 months?

Mission Critical

408 →
- ☐ Unified Communications ☐
- ☑ VoIP ☑
- ☐ Video Conferencing (std def.) ☐
- ☐ HD Video Conferencing (telepresence) ☐
- ☐ Storage Replication ☐
- ☐ Sharepoint ☐
- ☐ ERP, SAP, Oracle ☐
- ☐ Desktop Virtualization ☐
- ☐ Server based CRM, Siebel, etc. ☐
- ☐ Cloud based apps, SaaS ☐
- ☐ Cloud based infrastructure, IaaS ☐
- ☐ Cloud based compute, PaaS ☐
- ☐ Point of sale ☐

FIG. 4B

Application Fingerprint

(scale 1-10, 1 lowest – 10 highest)

|  | BW | Latency | Jitter | Error Rate |
|---|---|---|---|---|
| 502 → UC | 4 | 5 | 5 | 6 |
| VoIP | 1 | 7 | 8 | 8 |
| Vconf | 5 | 5 | 6 | 6 |
| Telepre | 8 | 6 | 7 | 7 |
| Replica | 6 | 8 | 3 | 7 |
| 504 → Share | 6 | 8 | 2 | 7 |
| ERP | 5 | 5 | 2 | 5 |
| 506 → DV | 3 | 4 | 2 | 4 |
| CRM | 3 | 3 | 1 | 4 |
| SaaS | 4 | 5 | 2 | 5 |
| IaaS | 7 | 7 | 5 | 6 |
| PaaS | 5 | 6 | 5 | 6 |
| PoS | 3 | 3 | 1 | 1 |

SYSTEMS AND METHODS FOR MANAGING WIDE AREA NETWORKS

TECHNICAL FIELD

Aspects of the present disclosure relate to communications networks, and in particular, to systems and methods for the management of wide area networks.

BACKGROUND

A wide area network (WAN) represents a type of computer network that enables communication between many different end points over a broad area. Generally, WANs facilitate the flow of data over large distances using a combination of intelligent networking architectures and various data protocols. Many corporate and governmental entities utilize WANs to communicate between different offices and/or operational locations located in various geographical areas, allowing such businesses and governmental entities to communicate regardless of location.

In order to maintain the integrity of the WAN, many entities employ WAN managers that are responsible for ensuring that the various applications, devices, and technologies within the WAN are functioning properly and efficiently, and are up to date. Often and particularly for a large, complex WAN, the WAN manager must be in constant and direct communication with other networking and application experts such as senior engineers, project engineers, and/or support engineers to implement, maintain, and upgrade the WAN, all of which may be expensive, time-consuming, and labor intensive. It is with these observations in mind, among others, that various aspects of the present disclosure were developed.

SUMMARY

Aspects of the present disclosure include methods for generating one or more recommendations for a configuration of a network. In various aspects, the method includes obtaining, at at least one processor, application fingerprint data comprising one or more values quantifying one or more associated application characteristics corresponding to one or more applications within a network. The method also includes obtaining, at the at least one processor, at least one statistical value based on the one or more values, the at least one statistical value quantifying the impact of the one or more application characteristics on the network. The method includes generating, at the at least one processor, at least one recommendation for a configuration of the network based on the at least one statistical value.

Aspects of the present disclosure also include systems for generating one or more recommendations for a configuration of a network. The system includes a database, a rules engine, and at least one processor. The processor may be configured to obtain application fingerprint data comprising one or more values quantifying one or more associated application characteristics corresponding to one or more applications within a network. The processor may also be configured to obtain at least one statistical value based on the one or more values, the at least one statistical value quantifying the impact of the one or more application characteristics on the network. The processor may be configured to generate at least one recommendation for a configuration of the network based on the at least one statistical value.

According to yet another aspect, a non-transient computer-readable medium encoded with a recommendation application comprising modules executable by at least one processor is provided. The modules include a WAN description module to obtain application fingerprint data comprising one or more values quantifying one or more associated application characteristics corresponding to one or more applications within a network. The modules include a calculation module to obtain at least one statistical value based on the one or more values, the at least one statistical value quantifying the impact of the one or more application characteristics on the network. The modules include a recommendation module to generate at least one recommendation for a configuration of the network based on the at least one statistical value.

BRIEF DESCRIPTION OF THE DRAWINGS

The foregoing and other objects, features, and advantages of the present disclosure set forth herein will be apparent from the following description of particular embodiments of those inventive concepts, as illustrated in the accompanying drawings. It should be noted that the drawings are not necessarily to scale; however, the emphasis instead is being placed on illustrating the principles of the inventive concepts. Also, in the drawings the like reference characters refer to the same parts throughout the different views. The drawings depict only typical embodiments of the present disclosure and, therefore, are not to be considered limiting in scope.

FIGS. 3A-4B are screen shots of data entry forms according to aspects of the WAN system, according to aspects of the present disclosure.

DETAILED DESCRIPTION

A WAN may be described as a computing network that involves a collection of local area networks and/or other networks. WANs generally span a wide geographical area, and can be used to connect devices distributed across cities, states, or even countries. Many WANs implement computer networking technologies to connect disparate location based computer networks to create a larger unified computer network. For example, the Internet represents an example of a WAN that connects local and regional networks across the world. Business and government entities utilize WANs to transmit data between employees, clients, buyers, and suppliers from various geographical locations. For example, a business enterprise may use a WAN to transmit data from a west coast business location to an east coast business location. Thus, WANs allow a business to effectively carry out its daily functions regardless of location.

WAN technologies evolve rapidly. For example, new and evolving service offerings, such as Frame Relay and Asynchronous Transfer Mode (ATM) and the development of Internet/internet protocol and/or intranet applications in business local area networks, provide new options for existing WAN technologies and architectures. Larger networks, such as telecommunication networks, that use multiple technologies are most likely to have opportunities for performance or efficacy gains from such technology innovation at all levels, and therefore, WAN management can be very challenging.

Accordingly, aspects of the present disclosure describe systems and corresponding methods for automatic generation of one or more application fingerprints that may be used to identify and recommend one or more technologies for use within a WAN environment. According to various aspects, a WAN management system receives input data describing one or more applications currently used within an existing WAN environment, or applications that will be used within a new WAN. The WAN management system may analyze the input data to quantitatively evaluate one or more characteristics of each application and generate one or more corresponding application fingerprints. Subsequently, the WAN management system may process and/or otherwise parse the one or more application fingerprints to calculate one or more values. The values, in conjunction with other data describing the one or more applications used in a WAN environment, may be executed against a set of rules by a rules engine. Based on the results, one or more recommendations may be provided that identify various technologies the WAN manager should use to update and existing WAN or implement the new WAN. Alternatively, the WAN management system may provide a recommendation as to whether the current technologies used to implement the WAN environment are appropriate for the identified applications.

Figure 1:
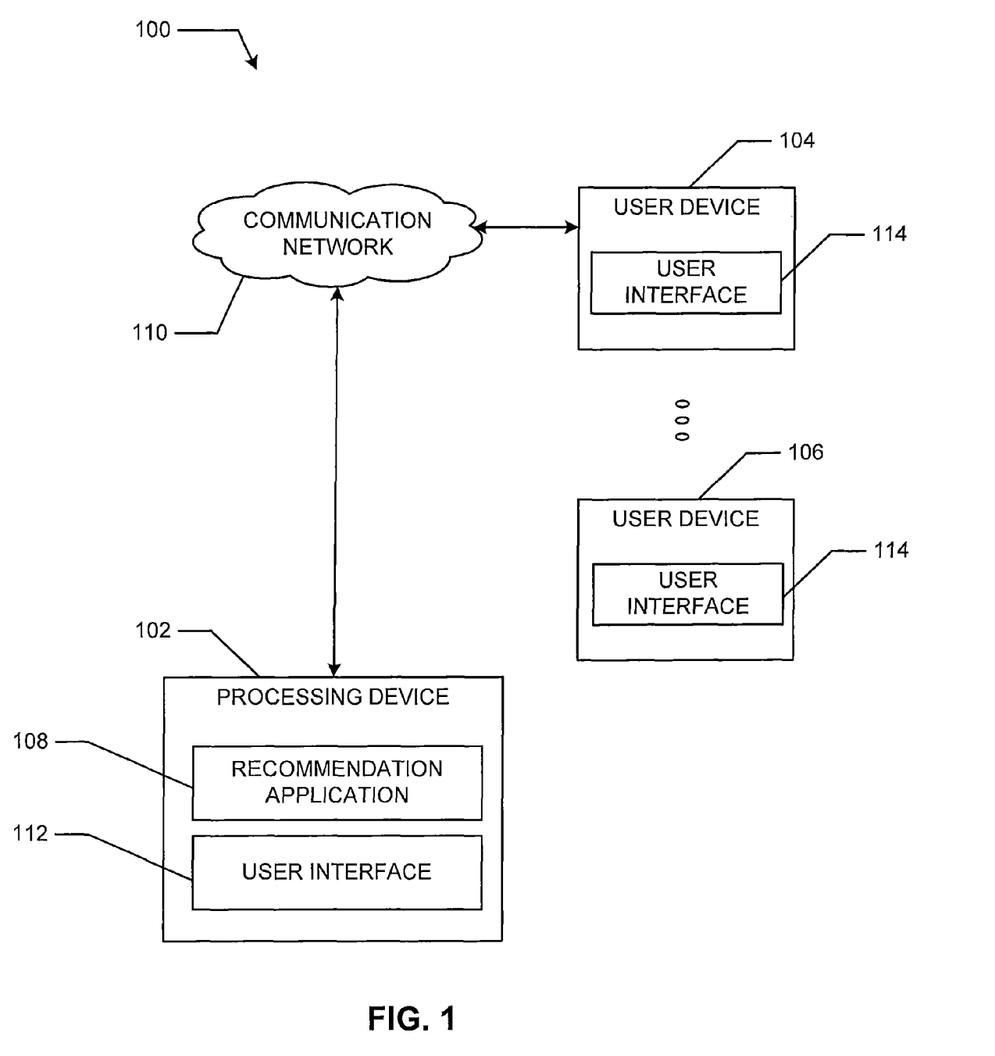
FIG. 1 is a block diagram illustrating a computing environment, according to aspects of the present disclosure.

FIG. 1 illustrates an example computing environment 100 that may implement various embodiments of the present disclosure. A processing device 102 and/or user devices 104-106 may include various hardware and/or software computing components for implementing the WAN management system. In particular, the processing device 102 and/or user devices 104-106 may include various hardware and/or software computing components that may be configured for implementing and/or generating one or more recommendations describing the various technologies for use within a WAN environment. For example, the processing device 102 may execute a recommendation application 108 that generates a fingerprint for each of the applications executing within a WAN, or to be executed within a WAN, and subsequently uses such fingerprints to generate various recommendations for the WAN environment. The fingerprint application 106 may be located on the processing device 102, on the user devices 104-106, or elsewhere.

The processing device 102 and/or the user devices 104-106 may be a personal computer, work station, server, mobile device, mobile phone, processor, and/or other processing device. Each device may include one or more processors that process software or other machine-readable instructions and includes a memory to store the software or other machine-readable instructions and data. The memory may include volatile and/or non-volatile memory. Additionally, each device may also include a communication system to communicate via wireline and/or wireless communication, such as through the Internet, an intranet, Ethernet network, a wireline network, a wireless network, and/or another communication network. The processing device 102 and/or the user devices 104-106 may further include a display (not shown) for viewing data, such as a computer monitor, and an input device (not shown), such as a keyboard or a pointing device (e.g., a mouse, trackball, pen, touch pad, or other device) for entering data and navigating through data, including exams, images, documents, structured data, unstructured data, HTML pages, other web pages, and other data.

According to one aspect, the processing device 102 and/or the user devices 104-106 may include user-interfaces (UI) 112 and 114 respectively, to receive input from a user describing the applications executing within a WAN. UIs 112 and 114 may include a display (not shown) such as a computer monitor, liquid crystal display, for viewing data and/or input forms, and any combination of input/output devices (not shown), such as a keyboard, or a pointing device (e.g., a mouse, trackball, pen, or touch pad), speaker, and/or any other type of device. A system conforming to various aspects of the disclosure may involve one or more of such user devices 104-106 that communicate with the processing device 102 by way of the communication network 110. For example, the user devices 104-106 may communicate with the processing device 102 through a large telecommunication network, such as the Internet.

Figure 2:
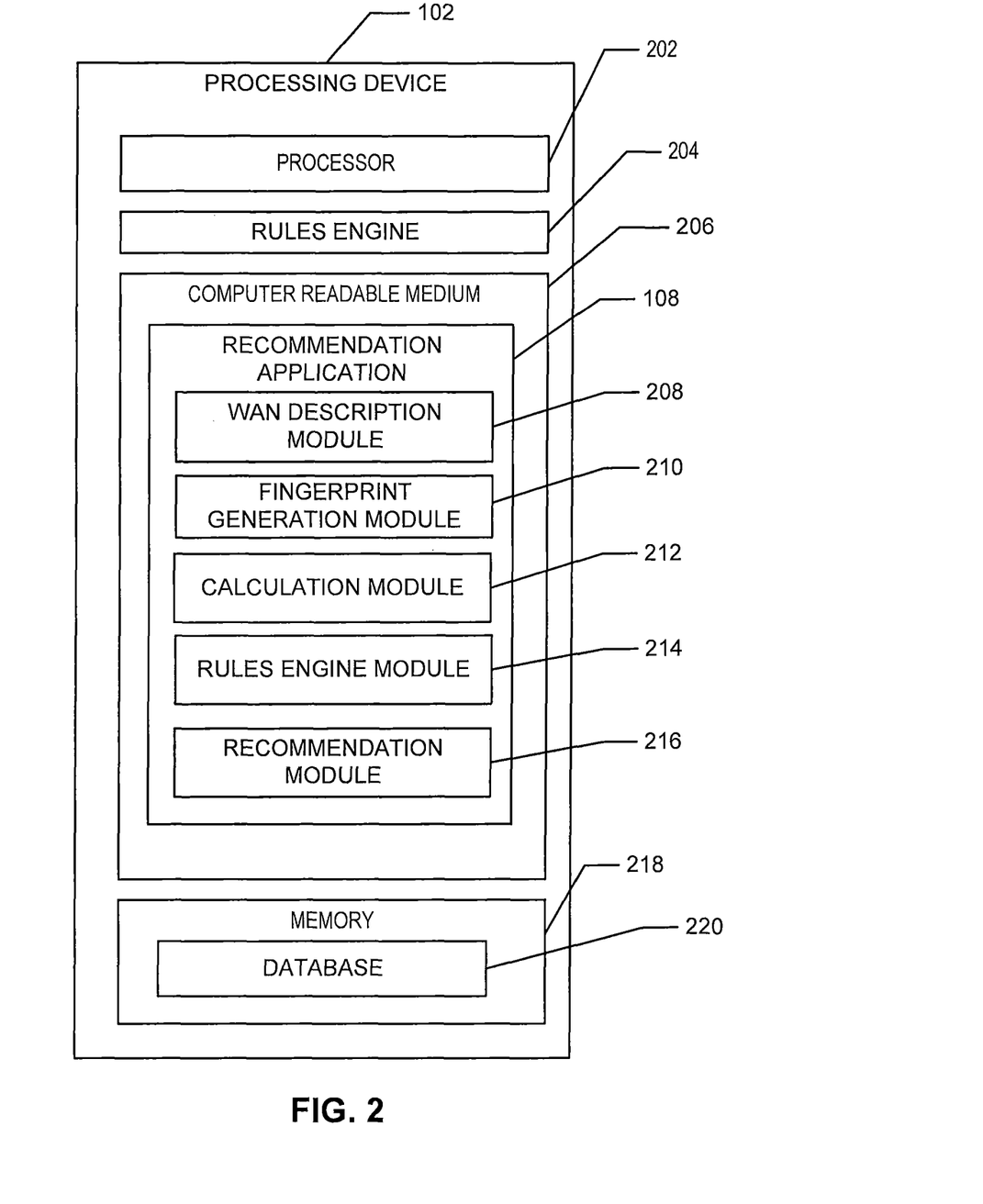
FIG. 2 is a block diagram illustrating a processing device, according to aspects of the present disclosure.

FIG. 2 is an example block diagram illustrating the various hardware and/or software components of the processing device 102 according to aspects of the present disclosure. The processing device 102 may include a processor 202 that may be used to execute the test recommendation application 108 that automatically generates one or more recommendations identifying various technologies that may be used within a WAN environment. The processor 202 may include memory and/or be in communication with a memory 218, which may include volatile and/or non-volatile memory. The processor 202 may also include various other computing components.

The processing device 102 may include a rules engine 204 capable of executing one or more rules that control and/or influence various technical aspects within a WAN environment. A rule describes as abstract structure defined in executable instructions that may be used to control the performance of an action, provision of response, and/or generation of other information in regards to a WAN and/or WAN environment. Rules may include conditional elements (e.g., and, or, not, exists, etc.), constraints (e.g., equal to, not equal to, greater than, contains, etc.) and outputs or actions (e.g., decrypt message, process next rule, forward message to aspect server, forward message to application server, initiate an aspect service, etc.). The rules engine 204 may be a logical component and/or processing system encoded as software, and/or embodied as a combination of software and hardware, capable of processing/executing one or more rules against a set of data, facts, and/or data sets. When aspects of a rule, such as a condition, match a fact and/or dataset, the rules engine 204 executes the rule to generate information, perform some action, etc. Accordingly, the rules engine 204 may provide the ability to access, apply, define, classify, and manage rules relating to various technical aspects of a WAN and/or WAN environment. While the rules engine 204 is illustrated as being a component of and/or otherwise a part of the processing device 102, it is contemplated that the rules engine may be located externally on another physical device such as a server.

The processing device 102 may also include a database 220 or access a database. The database 220 may be a general repository of data including but not limited to rules, description data, WAN technologies data and/or any other data relating to the identification and recommendation of one or more technologies to be used within a WAN environment. The database 220 may include memory and one or more processors or processing systems to receive, process, query and transmit communications and store and retrieve such data. In another aspect, the database 220 may be a database server.

The processing device 102 may include a computer readable medium ("CRM") 206, which may include computer storage media, communication media, and/or another available media medium that can be accessed by the processor 202. For example, CRM 206 may include non-transient computer storage media and communication media. By way of example and not limitation, computer storage media includes memory, volatile media, nonvolatile media, removable media, and/or non-removable media implemented in a method or technology for storage of information, such as machine/computer readable/executable instructions, data structures, program modules, or other data. Communication media includes machine/computer readable/executable instructions, data structures, program modules, or other data and include an information delivery media or system. The CRM 206 may store executable instructions to implement the recommendation application 108. Generally, program modules include routines, programs, instructions, objects, components, data structures, etc., that perform particular tasks or implement particular abstract data types.

According to one aspect, the recommendation application 108 may include a WAN description module 208 that receives description data describing the general state of the WAN. Description data may include information about how the WAN is used and basic details about the technologies employed within the WAN. For example, the WAN description data may include information describing how many remote sites exist within the WAN environment, a user's overall satisfaction with the WAN design, the geographic distribution of the various sites within the WAN, the number of Data Centers used within the WAN, etc. Other description data may also be included. Initially, the WAN description module 208 may transmit instructions that may be processed and/or executed to display one or more input forms on the one or more user devices 104-106. Subsequently, a user, such as a WAN manager, may interact with the one or more input forms to enter description data describing the current state and/or operational characteristics of the WAN that the WAN manager is currently monitoring.

FIGS. 3A-4B depict example screen shots of the one or more input forms transferred to the one or more user devices 104-106 by the WAN description module 208. In particular, FIGS. 3A-4B depict example questionnaire input forms. The questionnaire input forms may include various forms and/or components capable of receiving WAN description data input from a user of the one or more user devices 104-106, describing aspects of the WAN environment, and may be stored and later extracted from a database or other memory. The questionnaire input forms may include one or more questions relating to how the WAN is currently being used and the details about the current technologies (if any) employed in the WAN. The questions may be organized into categories such as: general questions, technological questions, and topology questions. Other categories of questions may also be included.

Figure 3A:
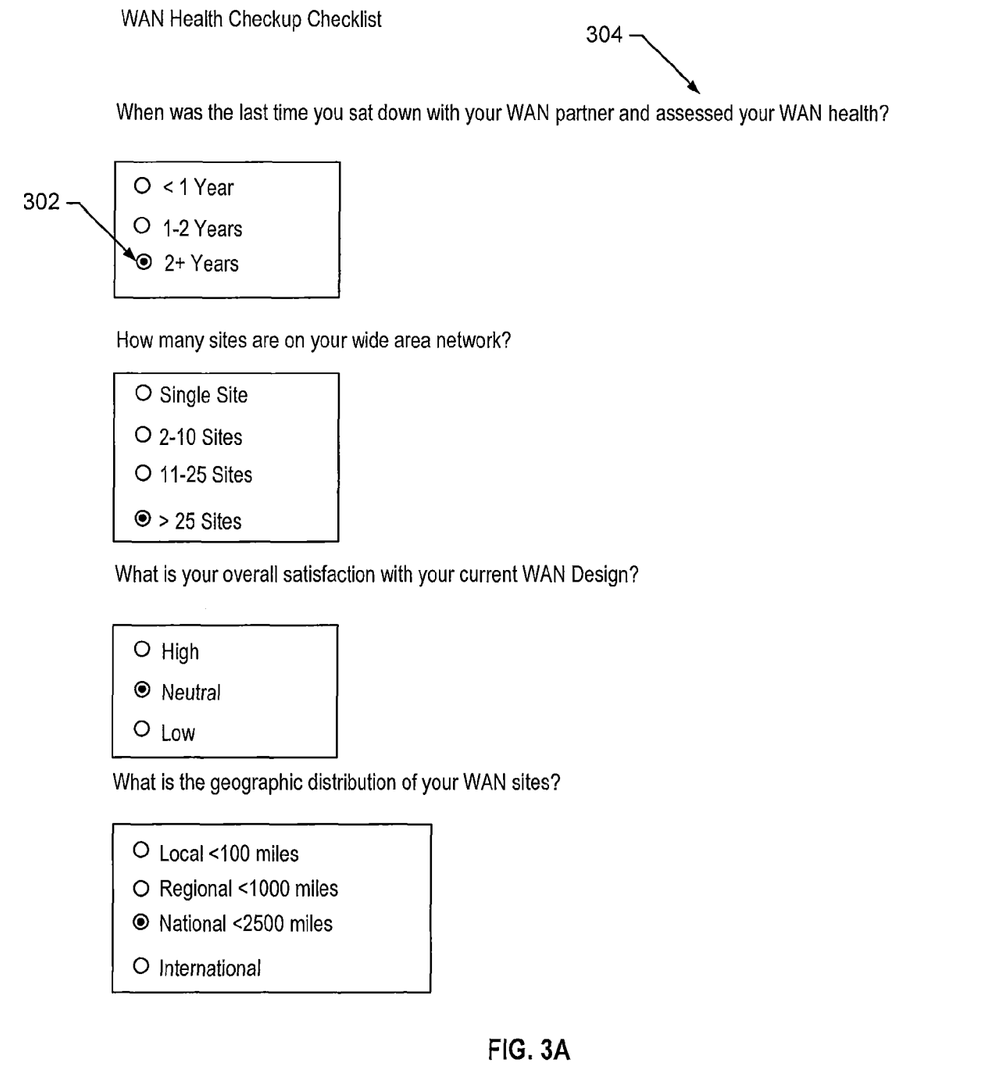
Figure 3B:
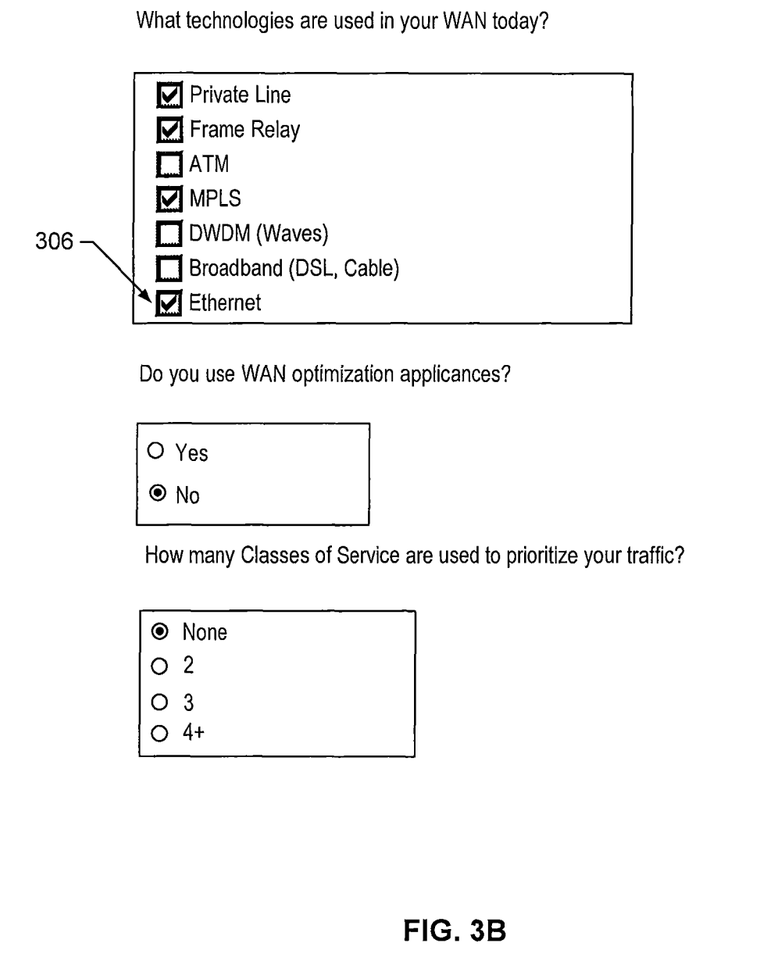
Figure 3C:
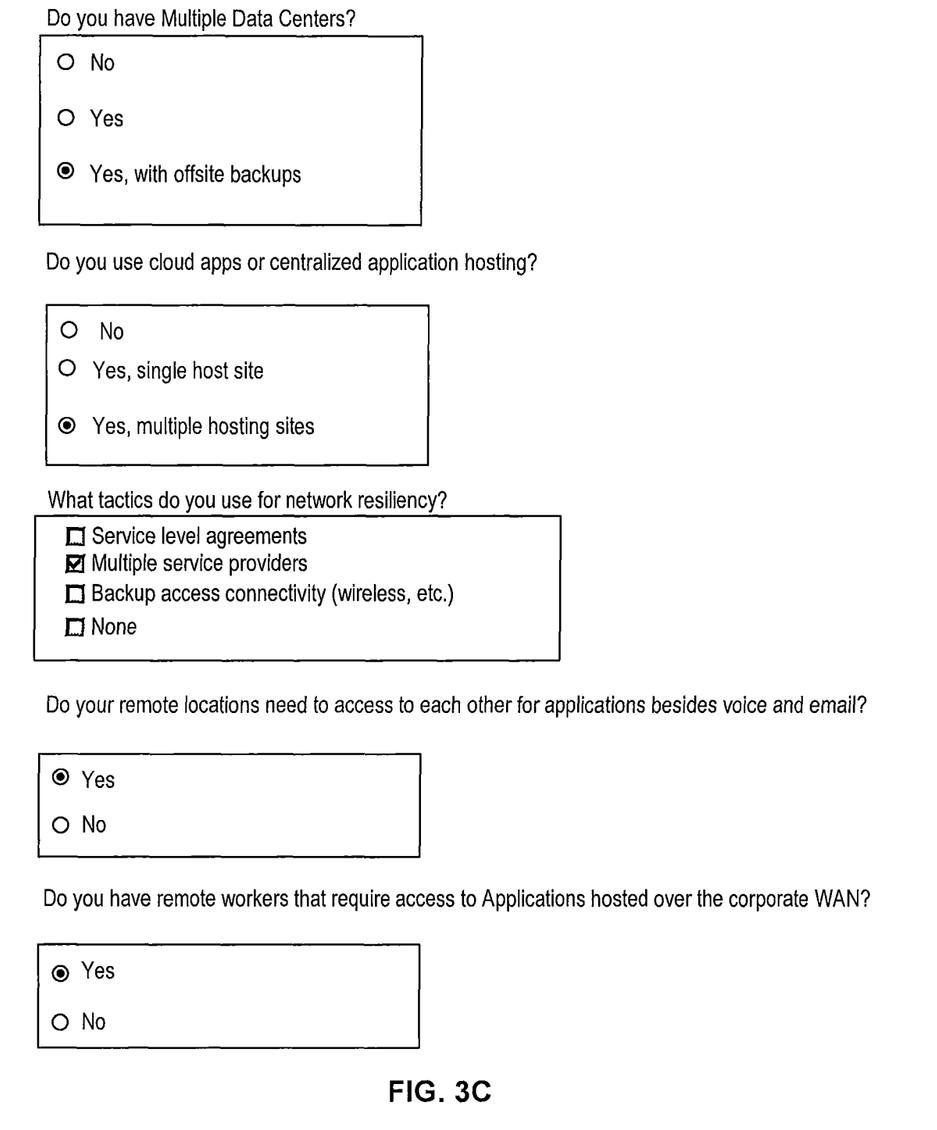
Figure 3D:
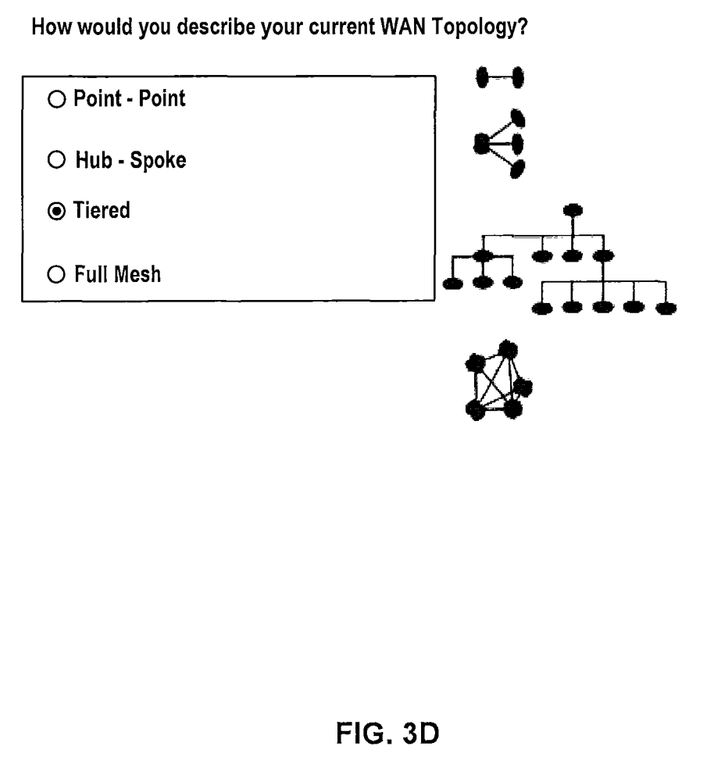

In one example, a user of the one or more user devices 104-106, such as the WAN manager, may interact with the questionnaire input form 3A to provide input into a radio button 302 for question 304 (i.e. what is your overall satisfaction with your current WAN design?) indicating that the manager's current level of satisfaction is neutral. As another example, the manager may interact with questionnaire input form 3B to provide input into a checkbox 306 indicating that Ethernet technologies are currently being used within the WAN environment. Other description data may be provided by a manager including: the number of Data Centers within the WAN, a description of the tactics used for network resiliency, and a description of whether remote locations need to access to each other as shown in FIG. 3C and a description of the current WAN topology as shown in FIG. 3D.

Figure 4A:
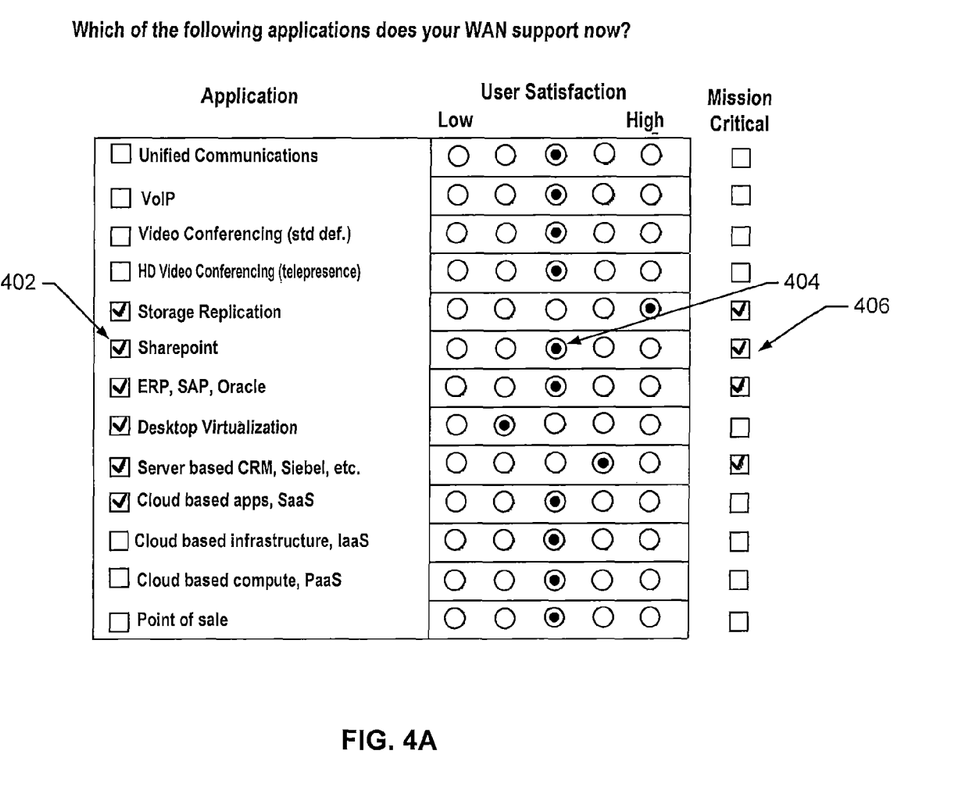

FIGS. 4A and 4B depict example application matrix input forms. The application matrix input forms may include various forms and/or components capable of receiving description data from a user of the one or more user devices 104-106 that describe the current applications used in and/or otherwise supported by the WAN environment. Such applications may include: unified communications, voice over internet protocol, video conferencing, data replication, telepresence, desktop virtualization, customer relationship management, point of sale systems, sharepoint, email, enterprise resource planning, software as a service, infrastructure as a service, platform as a service, etc. For example, a user, such as a WAN manager, may interact with one of the one or more user devices 104-106 to select checkbox 402 to provide data to the application matrix input forms 4A indicating that Sharepoint™ applications are currently executing within the WAN environment. Additionally, the user may indicate whether the selected applications are "mission critical" and the overall satisfaction level of end users of the selected application. Mission critical describes whether an application supports a crucial business process or not. The presence of mission critical applications in the WAN environment impacts the selection of recommended WAN technologies. For example, the WAN manager may select a radio button 404 indicating that the Sharpoint application has a neutral user satisfaction and a checkbox 406 indicating that the Sharepoint application is mission critical. While only a sample of applications have been discussed above, it is contemplated that any application within a WAN environment may be included.

Figure 4B:
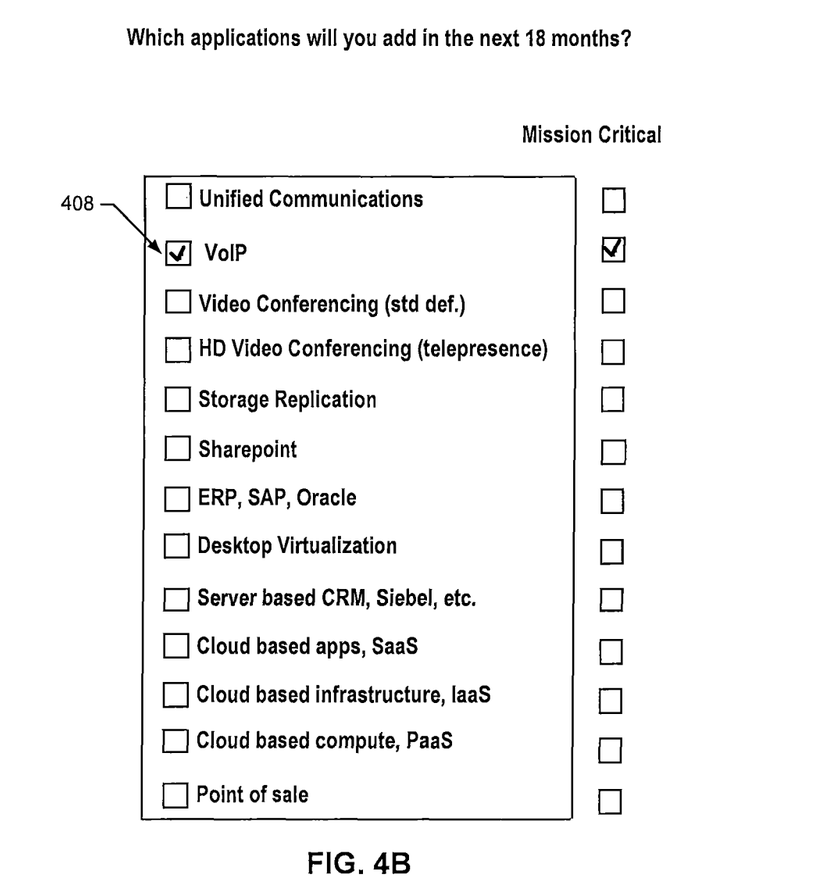

A user interacts with application matrix input form 4B to input data identifying any applications that may be added to the WAN environment during a future time period. Any form of time delineation may be used. For example, a user, such as a WAN manager, may interact with one of the one or more user devices 104-106 to select checkbox 408 and provide data to the application matrix input forms 4B indicating that a VoIP application may be added to the WAN environment in the next 18 months.

A fingerprint generation module 210 generates application fingerprints for each application identified by the various input forms illustrated in FIGS. 3A-4B. A fingerprint may be defined as a quantitative evaluation and/or classification of the impact that one or more characteristics is having on the WAN environment. An application characteristic is a trait, quality, and/or property commonly shared between one or more applications within the WAN environment. For example, an application may be quantitatively ranked on characteristics such as: bandwidth, latency, jitter, and/or error rate. Bandwidth defines that amount of available or consumed data communication resources expressed in bits/second or multiples of it (kilobits/s, megabits/s etc.) required to execute a session of a particular application within the WAN. Thus, a bandwidth characteristic for a particular application describes the impact the application has on the bandwidth capabilities of the WAN. Latency is a measure of time delay experienced in a system, or a description of the temporal speed at which information is received by an application. Jitter describes the variation between the timing of packets being delivered over a communication channel to an application. Thus, a latency characteristic for a particular application describes the impact the application has regarding the latency requirements of the WAN. Error rate describes the number of bit errors, or the number of received bits of a data stream over a communication channel that have been altered due to noise, interference, distortion or bit synchronization errors. An error rate characteristic for a particular application describes the impact the application has regarding the error rate requirements of the WAN. While only four application characteristics have been described, it is contemplated that the fingerprint may include any characteristic that may be quantitatively qualified for an application.

Figure 5:
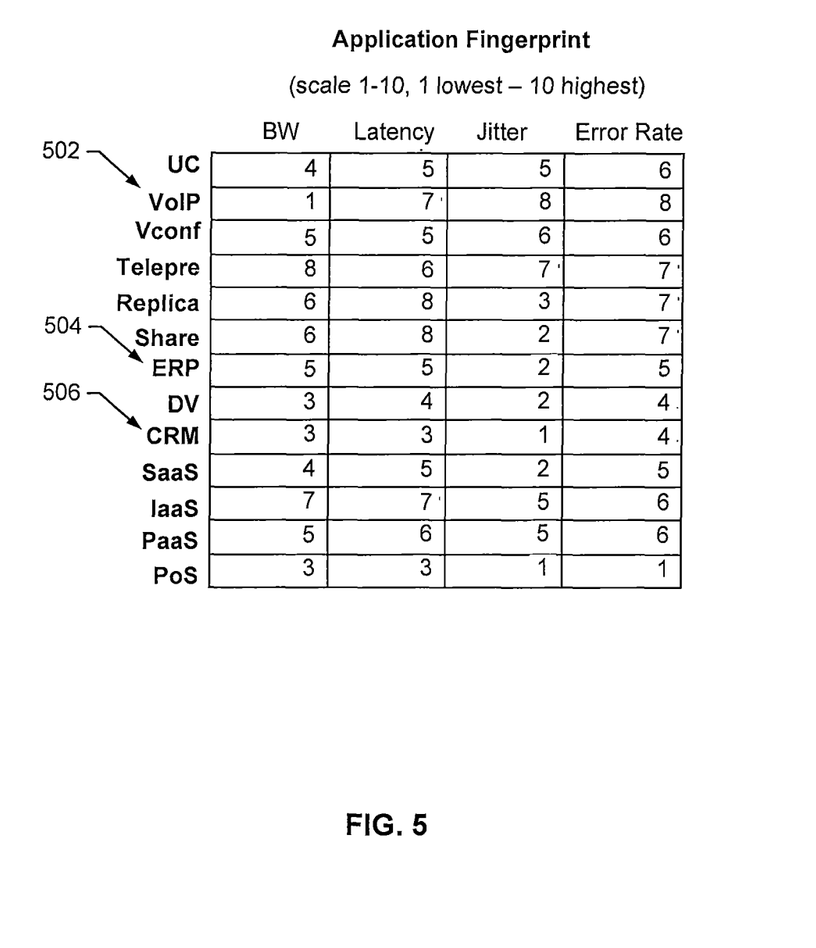
FIG. 5 is a screen shot of data entry forms according to aspects of the WAN system, according to aspects of the present disclosure.

FIG. 5 is an illustrative example of an application fingerprint matrix including application fingerprints for various applications within a WAN environment. The application matrix is a rectangular array of values, symbols, or expressions that quantitatively represent and/or otherwise classify the impact and/or effect each application is having on the WAN environment for each of the one or more characteristics corresponding to the application. Referring to FIG. 5, each application is provided with a numerical value on a scale of 1-10, 1 being the lowest and 10 being the highest, that numerically defines the impact and/or effect of each characteristic on the WAN for the particular application. Each value for each characteristic captures the relative impact on the WAN environment for the corresponding application in comparison to other applications executing within the WAN. For example, VoIP 502 has a value of 1 for bandwidth (BW), 7 for latency, 8 for jitter, and 8 for error rate, indicating that the VoIP application has a low bandwidth requirement, but high levels of jitter and latency when executing within the WAN environment. As another example, ERP 504 has a value of 5 for bandwidth (BW), 5 for latency, 2 for jitter, and 5 for error rate, indicating that the ERP application has mid-level bandwidth consumption, low levels of jitter, and a mid-level impact of error rate on the WAN environment when executing within the WAN environment. In yet another example, CRM 506 has a value of 3 for bandwidth (BW), 3 for latency, 1 for jitter, and 4 for error rate, indicating that the CRM application has a low bandwidth, latency, jitter and error rate impact on the WAN environment. While the above examples have been provided using a numerical scale, it is contemplated that any type of scale may be used to quantitatively evaluate the impact of the various characteristics corresponding to an application within the WAN.

A calculation module 212 receives the one or more application fingerprints generated by the fingerprint generation module 210 and calculates one or more statistical values that quantitatively describe the overall impact that each characteristic has on the WAN environment. For example, an "average bandwidth requirement" value may be calculated that defines the average bandwidth impact across all applications within the WAN environment. The average bandwidth requirement is calculated using the fingerprint data corresponding to the bandwidth for each application within the WAN. Accordingly, in one example, four different "average requirement" values may be calculated, one for the average bandwidth, latency, jitter, and error rate. The calculation module 212 may also calculate a "most demanding" value that numerically defines the most demanding value for each characteristic across all applications. The calculation module 212 may calculate a "variation" value that describes the variation between each application for each characteristic. For example, a variation value quantifying the variation for the bandwidth, latency, jitter, and error rate characteristic between all of the applications may be calculated.

The calculation module 212 may further calculate a "standard deviation" value that quantifies the standard deviation between each application for each characteristic. For example, a standard deviation value quantifying the standard deviation for the bandwidth, latency, jitter, and error rate characteristics between all of the applications may be calculated. Average deviation and max deviation may also be calculated. Deviation is a mathematical statistical function that calculates the variance of a set of individual values. Average deviation is the average of the sum of the variances. Maximum deviation is the greatest deviation value of all deviations. Standard deviation is the square root of the data set's variance. All of such deviation values may be calculated using the values within the one or more application fingerprints generated by the fingerprint module 210. Finally, the calculation module 212 may calculate a value indicating whether any of the applications are mission critical.

A rules engine module 214 may initiate the execution of the rules engine 204 to execute one or more rules against the one or more values generated by the calculation module 212 and/or the description data received by the various input forms depicted in FIGS. 3A-4B. Each rule contains a predefined equation incorporating one or more values from the calculation module 212 and/or description data received by the description module 208, in the form of conditional elements, etc. The rules engine evaluates each rule's equation to determine which rules are matched and/or passed. When a rule is matched and/or passed, a recommendation module 216 may generate a recommendation identifying one or more technologies that the WAN manager should use within a WAN environment. The recommendation may include instructions describing how a WAN manager should alter, configure, upgrade, implement, etc., various technical aspects of the WAN. Alternatively, the recommendation module 216 may generate a recommendation identifying a configuration of one or more technologies that the WAN manager should implement.

For example, a Rule 1 with the condition stating "if high bit error rate and no private line," may be stored in the database 220. The rules engine module 214 may execute Rule 1 against an "average error rate" value of 10 generated by the calculation module 212 and description data indicating that there is no private line currently executing within the WAN. If Rule 1 passed, the recommendation module 216 may generate a recommendation stating:

Different types of WAN technologies have unique capabilities in terms of bandwidth, latency, jitter, and packet error rates. Certain applications such as telepresence or VoIP perform best with WAN technologies that have very low error rates. Your WAN supports a combination of applications that may perform better with WAN connectivity that offers better packet delivery rates.

The recommendation is based on the fact that the "average error rate" value calculated by the calculation module 212 (i.e. 10) is high, which indicates that currently the applications within the WAN are highly impacted by error rate issues. Private Line technologies offer lower error rates and are not current being used in the WAN environment. Thus, the WAN may perform better with technologies that offer better packet delivery rates, such as Private Line.

As another example, a Rule 2 may relate to the type of switching a WAN is currently implementing and whether or not the WAN is currently classifying network traffic, which is referred to as classification of service. In particular, the Rule 2 may have the condition stating, "if multiprotocol label switching (MPLS) is being used and no Class of Service and the average standard deviation of bandwidth requirement is greater than 1." The rules engine module 214 may execute Rule 2 against an "average standard deviation bandwidth value" of 2, generated by the calculation module 212, and description data indicating that currently there is MPLS within the WAN environment without Class of Service. If Rule 2 passed, the recommendation module 216 may generate a recommendation stating, "since you have a mix of applications that require a range of different WAN performance criteria you should strongly consider employing Class of Service tagging over your. MPLS service." The recommendation is based on the fact that the "average standard deviation value" of 2 is greater than 1, indicating that there is a diverse set of application requirements. Since MPLS allows for the separation of WAN traffic by application using Class of Service and the current WAN environment does not employ this feature, the WAN environment could be improved to provide better application support if Class of Service is used.

In one possible implementation, the one or more recommendations may be categorized in accordance with an urgency level. For example, the recommendation may be categorized using color coding based on urgency. If the technology recommendations should be applied immediately, the recommendations may be identified using a red color code. Alternatively, if the technology recommendations do not require immediate application, they may be color coded as green. Other types of categorizations may also be used. The recommendations generated by the recommendation module 216 may be transmitted and/or otherwise provided to the one or more user devices 104-106. While the above examples only apply one rule at a time, it is contemplated that any number (i.e. multiple) of rules may be applied at a given time.

Figure 6:
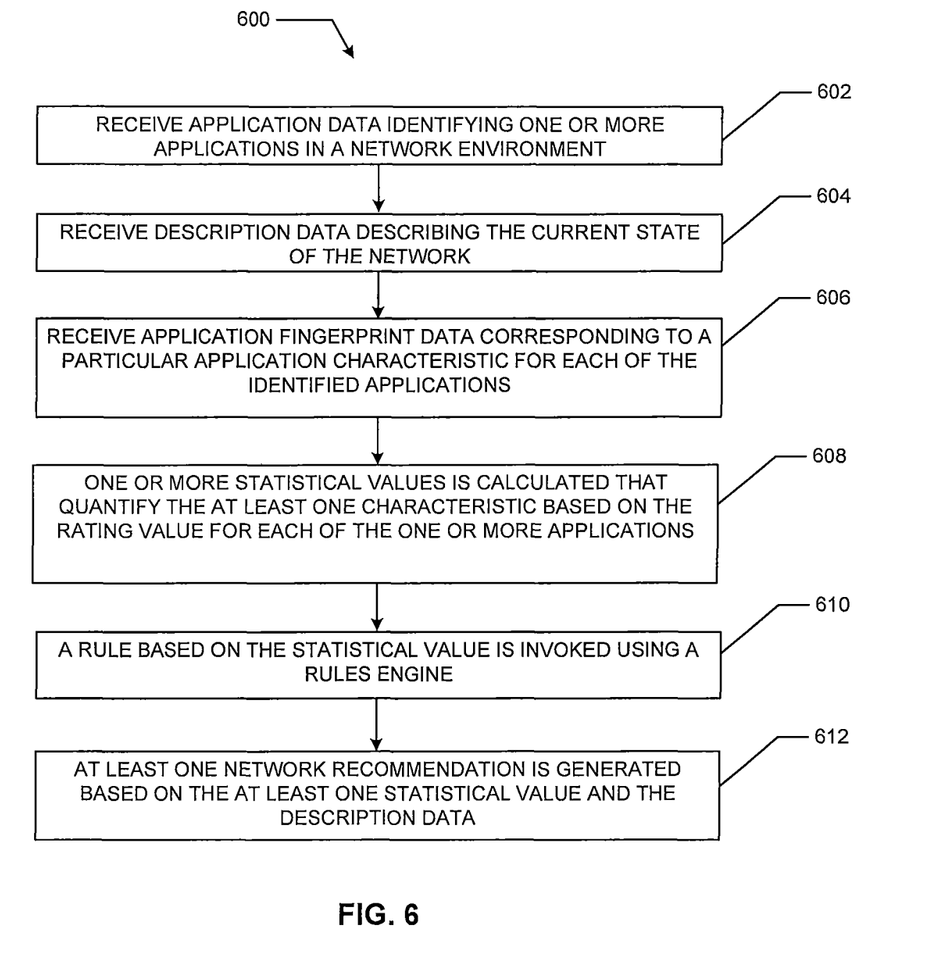
FIG. 6 is a flowchart illustrating an example process for identifying one or more technologies for use in a WAN within a communications network, according to aspects of the present disclosure.

FIG. 6 depicts an example embodiment of a method and/or process 600 for recommending one or more applications for use within a WAN environment. The process 600 may be executed by at least one processor encoded with, or executing instructions of, a recommendation application 108. At 602, description data identifying one or more applications executing within a network is received. For example, a user, such as a WAN manager, interacts with the user device 102 to input data identifying a VoIP, Video Conferencing, and Desktop Virtualization application as being used within a WAN environment. Description data describing the current state of the network environment is received at 604. For example, description data indicating a WAN manager's overall satisfaction with the WAN design may be received through the input form illustrated in FIG. 3A. Application fingerprint data is received corresponding to a particular application characteristic for each of the identified applications at 606. For example, application fingerprint data is received for the VoIP, Video Conferencing, and Desktop Virtualization applications where each fingerprint includes a value relatively quantifying the particular application's current bandwidth usage level. At 608, one or more statistical values are calculated that quantify the characteristic based on the value for each of the one or more applications. For example, a standard deviation statistical value is calculated using the bandwidth rating for the VoIP, Video Conferencing, and Desktop Virtualization applications that were identified.

At 610, a rule based on the statistical value is invoked using a rules engine. For example, rules engine 204 is invoked to execute a rule with the condition "If WAN design is low and bandwidth is high" using the statistical bandwidth calculation and the description data regarding WAN design. At 612, at least one network recommendation is generated based on the at least one statistical value and the description data. For example, a recommendation providing instructions as to how bandwidth capabilities may be expanded using a new WAN design may be generated.

Thus, aspects of the present disclosure as described above implement methods for the automatic generation of one or more application fingerprints to identify one or more technologies that may be used to implement a new WAN and/or within an existing WAN. The description above includes example systems, methods, techniques, instruction sequences, and/or computer program products that embody techniques of the present disclosure. However, it is understood that the described disclosure may be practiced without these specific details.

In the present disclosure, the methods disclosed may be implemented as sets of instructions or software readable and executable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to, magnetic storage medium (e.g., floppy diskette), optical storage medium (e.g., CD-ROM); magneto-optical storage medium, read only memory (ROM); random access memory (RAM); erasable programmable memory (e.g., EPROM and EEPROM); flash memory; or other types of medium suitable for storing electronic instructions.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A method for generating a recommendation for a network comprising:
   obtaining, at least one processor, application fingerprint data comprising one or more application characteristic values, each of the application characteristic values quantifying one or more associated application characteristic corresponding to one or more applications within a network;
   obtaining, at the at least one processor, at least one statistical value based on the one or more application characteristic values, the at least one statistical value quantifying an impact of the one or more application characteristics on the network; and
   generating, at the at least one processor, at least one recommendation for a configuration of the network based on the at least one statistical value and on whether a network technology is implemented on the network.

2. The method of claim 1, wherein the one or more applications is selected from the group consisting of: unified communications, voice over internet protocol, video conferencing, data replication, telepresence, desktop virtualization, customer relationship management, point of sale systems, and sharepoint.

3. The method of claim 1, further comprising:
   invoking, at the at least one processor, at least one rule using a rules engine, the at least one rule including a condition based on the at least one statistical value and on whether a network technology is implemented on the network,
   wherein generating the at least one recommendation is based on satisfaction of the condition.

4. The method of claim 3, further comprising:
   obtaining, at the at least one processor, description data describing the state of the network, the description data provided by a user through a user interface, wherein the at least one rule is further based on the description data.

5. The method of claim 1, wherein the application characteristic is bandwidth and wherein the at least one statistical value is average bandwidth requirement.

6. The method of claim 1, wherein the network is a wide area network.

7. The method of claim 1, wherein the fingerprint data comprises a matrix comprising the one or more application characteristic values.

8. A system for generating a recommendation for a network comprising:
   a database;
   a rules engine;
   at least one processor to:
      obtain application fingerprint data comprising one or more application characteristic values quantifying one or more associated application characteristics corresponding to one or more applications within a network;
      obtain at least one statistical value based on the one or more application characteristic values, the at least one statistical value quantifying the impact of the one or more application characteristics on the network; and
      generate at least one recommendation for a configuration of the network based on the at least one statistical value and on whether a network technology is implemented on the network.

9. The system of claim 8, wherein the one or more applications is selected from the group consisting of: unified communications, voice over internet protocol, video conferencing, data replication, telepresence, desktop virtualization, customer relationship management, point of sale systems, and sharepoint.

10. The system of claim 8, wherein the processor is further configured to:
    invoke at least one rule using a rules engine the at least one rule including a condition based on the at least one statistical value and on whether a network technology is implemented on the network;
    wherein generating the at least one recommendation is based on satisfaction of the condition.

11. The system of claim 8, wherein the processor is further configured to:
    obtain description data describing the state of the network; and
    invoke at least one rule based on the statistical value and the description data using a rules engine to generate a result, wherein to generate the at least one recommendation is based on the result of the invocation of the at least one rule.

12. The system of claim 8, wherein the application characteristic is bandwidth and wherein the at least one statistical value is average bandwidth requirement.

13. The system of claim 8, wherein the network is a wide area network.

14. A non-transient computer-readable medium encoded with a recommendation application comprising modules executable by at least one processor, the modules comprising:
    a WAN description module to obtain application fingerprint data comprising one or more application characteristic values quantifying one or more associated application characteristics corresponding to one or more applications within a network;
    a calculation module to obtain at least one statistical value based on the one or more application characteristic values, the at least one statistical value quantifying the impact of the one or more application characteristics on the network; and
    a recommendation module to generate at least one recommendation for a configuration of the network based on the at least one statistical value and on whether a network technology is implemented on the network.

15. The non-transient computer-readable medium of claim 14, wherein the one or more applications is selected from the group consisting of: unified communications, voice over internet protocol, video conferencing, data replication, telepresence, desktop virtualization, customer relationship management, point of sale systems, and sharepoint.

16. The non-transient computer-readable medium of claim 14, further comprising a rules engine module to invoke at least one rule value using a rules engine to the at least one rule including a condition based on the at least one statistical value and on whether a network technology is implemented on the network, wherein the recommendation module generates the at least one recommendation based on satisfaction of the condition.

17. The non-transient computer-readable medium of claim 14, wherein the WAN description module is further configured to obtain description data describing the state of the network, and wherein the recommendation application further comprises:
    a rules engine module to invoke at least one rule using a rules engine, the rule including a condition based on the at least one statistical value and on whether a network technology is implemented on the network, wherein the recommendation module generates the at least one recommendation based on the satisfaction of the condition.

18. The non-transient computer-readable medium of claim 14, wherein the application characteristic is bandwidth and wherein the at least one statistical value is average bandwidth requirement.

19. The non-transient computer-readable medium of claim 14, wherein the network is a wide area network.

20. The non-transient computer-readable medium of claim 14, wherein the fingerprint data comprises a matrix comprising the one or more application characteristic values.

* * * * *